United States Patent
Stegmaier

(10) Patent No.: US 9,932,088 B2
(45) Date of Patent: Apr. 3, 2018

(54) METHOD FOR CONTROLLING AN ELECTRIC DRIVE OF A VEHICLE WHICH IS OPERABLE BY MUSCULAR ENERGY AND/OR MOTOR POWER, AND VEHICLE OF THIS KIND

(71) Applicant: Robert Bosch GmbH, Stuttgart (DE)

(72) Inventor: Juergen Stegmaier, Tuebingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 139 days.

(21) Appl. No.: 14/908,617

(22) PCT Filed: Jun. 18, 2014

(86) PCT No.: PCT/EP2014/062790
§ 371 (c)(1),
(2) Date: Jan. 29, 2016

(87) PCT Pub. No.: WO2015/018554
PCT Pub. Date: Feb. 12, 2015

(65) Prior Publication Data
US 2016/0185418 A1  Jun. 30, 2016

(30) Foreign Application Priority Data
Aug. 6, 2013 (DE) .......... 10 2013 215 487

(51) Int. Cl.
*B60L 9/00* (2006.01)
*B60L 11/00* (2006.01)
(Continued)

(52) U.S. Cl.
CPC ............... *B62M 6/45* (2013.01); *B62M 6/50* (2013.01); *B62M 6/55* (2013.01)

(58) Field of Classification Search
CPC . B62M 6/45; B62M 6/60; B60M 6/00; B60M 6/45
(Continued)

(56) References Cited

U.S. PATENT DOCUMENTS

| 6,767,308 B2* | 7/2004 | Kitamura ............... B62K 25/04 180/220 |
| 2013/0054067 A1* | 2/2013 | Shoge ...................... B62M 6/45 701/22 |
| 2013/0317679 A1* | 11/2013 | Tanaka ..................... B62M 6/45 701/22 |

FOREIGN PATENT DOCUMENTS

| EP | 0 893 338 | 1/1999 |
| EP | 2 447 108 | 5/2012 |

(Continued)

OTHER PUBLICATIONS

International Search Report for PCT/EP2014/062790, dated Sep. 15, 2014.

*Primary Examiner* — Isaac G Smith
(74) *Attorney, Agent, or Firm* — Norton Rose Fulbright US LLP; Gerard Messina

(57) ABSTRACT

A method for controlling an electric drive of a vehicle is provided, e.g., an electric bicycle, which is able to be operated by muscular energy and/or motor power, the vehicle including a crank gear and the electric drive being disposed at the crank gear. The method includes: ascertaining a driving situation, for which the electric drive is to be used, and in this situation, initially running up the electric drive at a first gradient, and then at a second gradient, the first gradient being greater than the second gradient.

11 Claims, 2 Drawing Sheets

(51) Int. Cl.
  *G05D 1/00* (2006.01)
  *B62M 6/45* (2010.01)
  *B62M 6/55* (2010.01)
  *B62M 6/50* (2010.01)

(58) Field of Classification Search
  USPC .................. 701/22; 180/206.1; 280/200
  See application file for complete search history.

(56) References Cited

FOREIGN PATENT DOCUMENTS

| EP | 2 537 739 | 12/2012 |
|----|-----------|---------|
| JP | H07 33070 | 2/1995 |
| JP | 2002 240772 | 8/2002 |
| JP | 2002240772 A * | 8/2002 |
| JP | 2002 264882 | 9/2002 |
| JP | 2004 243920 | 9/2004 |

* cited by examiner

METHOD FOR CONTROLLING AN ELECTRIC DRIVE OF A VEHICLE WHICH IS OPERABLE BY MUSCULAR ENERGY AND/OR MOTOR POWER, AND VEHICLE OF THIS KIND

BACKGROUND OF THE INVENTION

1. Field of the Invention

The present invention relates to a method for controlling an electric drive of a vehicle which is able to be operated by muscular energy and/or motor power, in particular an electric bicycle; it also relates to such a vehicle.

2. Description of the Related Art

Electric vehicles and/or vehicles which can be operated by muscular energy are known in various embodiments from the related art. For example, there are electric bicycles whose electric drive is situated in the region of the bottom bracket (center motor concept). A rear wheel can then be driven via a chain ring and a chain. As a rule, the electric drive is decoupled from the driving mechanism by an overrunning clutch. In this context it can happen that the electric drive is coupled into the output side in an abrupt manner, which may lead to high power and torque peaks in the drive train. For instance, this is the case when the electric bicycle is rolling and the driver, using muscular energy, starts pedaling out of the rolling state, and the electric drive is to be connected in addition.

BRIEF SUMMARY OF THE INVENTION

In contrast, the method of the present invention for controlling an electric drive of a vehicle that is able to be operated by muscular energy and/or motor power has the advantage of enabling a soft and jerk-free coupling of the electric drive. In particular, no undesired power peaks and/or torque peaks arise in the process, so that mechanical components of the drive system are not unnecessarily stressed by jerking or the like. In addition, the method of the present invention may be carried out in a cost-effective and rapid manner. According to the present invention, in a vehicle in which a crank gear is provided and an electric drive is situated at the crank gear, e.g., an electric bicycle having a central motor, it is ascertained in a first step whether a driving situation is at hand for which the electric drive is to be connected in addition. Then, the electric drive is run up, the run-up taking place at a first gradient at the beginning and then at a second gradient. The first gradient is greater than the second gradient. According to the present invention, the run-up of the electric drive thus is carried out at different gradients, which leads to a softer connection of the electric drive to the crank gear operated by the rider. Since the first gradient is higher than the second gradient, the inventive method thereby ensures that the electric drive reaches the highest possible rotational frequency in the shortest time possible. This makes it possible to achieve an approximate adaptation of the rotational frequency of the electric drive and the crank gear able to be operated by the rider by muscular energy within the shortest time possible.

The electric drive is preferably run up using the first gradient until a rotational frequency of the electric drive is always less than a minimum rotational frequency of the gearshift mechanism, in particular until approximately 90% of the rotational target frequency has been reached. This makes it possible to virtually avoid jarring or the like when connecting the electric drive to the crank gear operated by muscular energy.

Especially preferably, the first and/or second gradient and/or a switchover instant from the first to the second gradient are/is ascertained based on a transmission ratio of a gearshift mechanism of the vehicle. The ascertainment based on the transmission ratio of the gearshift mechanism enables a very soft coupling of the electric drive, since the target rotational frequency of the electric drive is basically high when a low gear is engaged, and the target rotational frequency of the electric drive is basically low when a high gear is engaged.

The actual (precise) transmission ratio of the gearshift mechanism is preferably able to be ascertained with the aid of a gear shift sensor, for example. However, this requires an additional gear selection sensor, which has financial disadvantages.

As an alternative or in addition, the transmission ratio is ascertained in that a minimum transmission ratio and a maximum transmission ratio stored by the manufacturer of the vehicle are stored in a memory, and a control unit determines the first and second gradients and/or a switchover instant based on these stored values. Since the actual gear selection and the actual transmission ratio are not known in this variant, a certain fuzzy range results. According to the present invention, this fuzzy range now is placed in the range of the second gradient in which the rotational frequency of the electric drive rises more slowly in accordance with the gradient limitation, until a rotational target frequency has been achieved. This makes it highly likely that jerks or the like are prevented.

Moreover, the first and/or second gradient and/or the switchover instant are/is additionally or alternatively ascertained based on a vehicle speed. This may usually be done without additional expense since vehicles of this type are frequently equipped with a sensor system for ascertaining the speed.

Moreover, the first and second gradient and/or the switchover instant are preferably and/or alternatively ascertained based on a rotational frequency of the crank gear supplied by a rider by muscular energy, and/or based on a torque of the crank gear.

To ensure that the connection of the electric drive takes place in the most jerk-free manner possible, the first gradient is preferably maintained for a shorter period of time than the second gradient during the run-up of the electric drive.

Moreover, a continual transition between the first gradient and the second gradient is preferably provided, so that a soft change in the gradient is able to take place.

Furthermore, the run-up of the electric drive at the first gradient and/or the second gradient is preferably performed only across a predefined time interval.

It is furthermore preferred that the method of the present invention is carried out in such a way that the rotational target frequency will be reached within 100 ms. Moreover, the electric drive may preferably also be run up using three or more different gradients, but this basically increases the control requirements.

In addition, the present invention also relates to a vehicle which is able to be operated by muscular energy and/or motor power, in particular an electric bicycle, which includes a crank gear and an electric drive which is situated in the region of the crank gear (center motor concept). Moreover, the vehicle includes a control unit which is designed to run up the electric drive. The run-up of the electric drive is carried out using at least one first and second gradient, the first gradient being higher than the second gradient.

Furthermore, the vehicle preferably includes a gearshift mechanism and a memory, in which a maximum and/or minimum transmission ratio of the gearshift mechanism is stored. The control unit is designed to determine the first and second gradient, and/or a switchover instant based on the maximum and/or minimum transmission ratio of the gearshift mechanism.

As an alternative or in addition, the vehicle also includes a sensor for acquiring the actual transmission ratio, e.g., a gearshift selection sensor.

Moreover, the vehicle preferably is also equipped with a speed sensor, which records a speed of the vehicle, the control unit being designed to determine the first and/or second gradient and/or the switchover instant based on the speed of the vehicle.

According to one further preferred specific embodiment of the present invention, the vehicle also includes a rotational frequency sensor, which records a rotational frequency of the crank gear operable by muscular energy, and determines the first and/or second gradient and/or the switchover instant based on this acquired value.

As a further alternative, the vehicle is equipped with a torque sensor, which acquires a torque of the crank gear operable by muscular energy, and the control unit is designed to determine the first and/or second gradient and/or the switchover instant based on the acquired torque value at the crank gear.

The vehicle according to the present invention preferably is an electric bicycle. When the electric bicycle is in operation, the present invention enables a practically jolt-free or push-free connection of the electric drive in all kinds of driving situations and especially also the driving situation, because the vehicle is in a rolling state and the driver starts pedaling and the electric drive is to be connected in addition.

DETAILED DESCRIPTION OF THE INVENTION

An electric bicycle 1 according to a first preferred exemplary embodiment of the present invention will be described in detail in the following text with reference to FIGS. 1 and 2.

Figure 1:
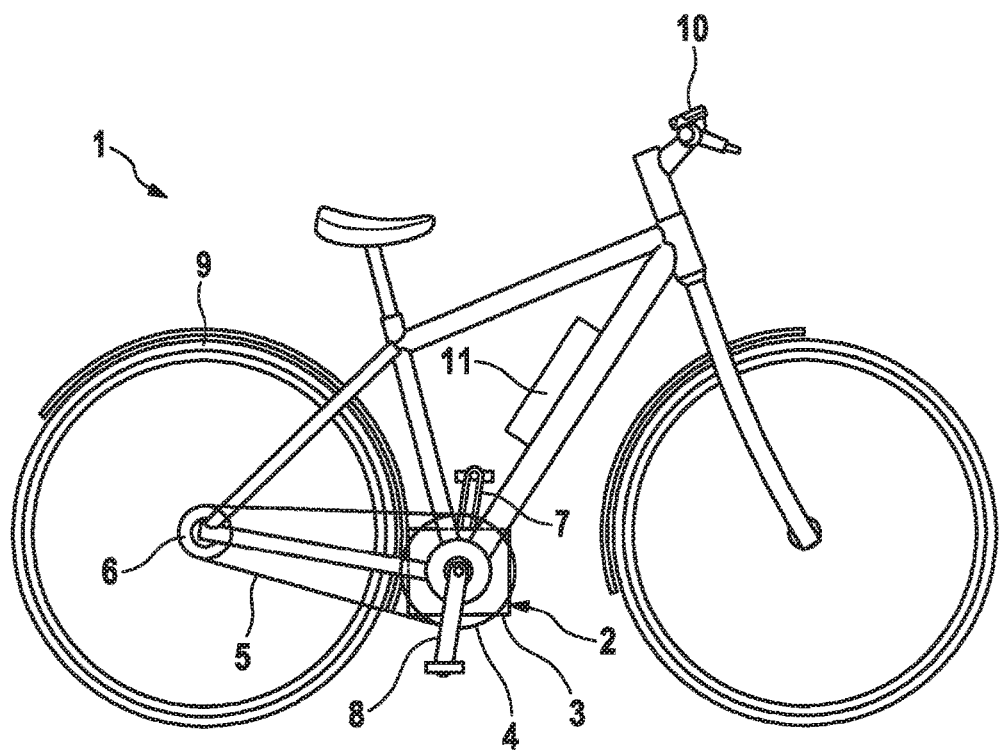
FIG. 1 shows a schematic illustration of an electric bicycle according to a first exemplary embodiment of the present invention.

As can be gathered from FIG. 1, electric bicycle 1 includes a crank gear 2 having two cranks 7, 8, on which pedals are situated. An electric drive 3 is integrated into crank gear 2. A gearshift mechanism 6 is disposed on rear wheel 9.

A drive torque provided by the driver and/or electric drive 3 is transmitted from a chain ring 4 on crank gear 2 via a chain 5 to a sprocket of gearshift mechanism 6.

In addition, a control unit 10, which is connected to electric drive 3, is situated on the steering wheel of the bicycle. Reference numeral 11 identifies a battery, which supplies electric drive 3 with energy.

Control unit 10 is developed in such a way that electric drive 3 is run up to a rotational target frequency Z. This is shown schematically in the diagram of FIG. 2. Rotational target frequency Z always lies between a minimum rotational frequency X when the highest gear is engaged on the bicycle, and a maximum rotational frequency Y when the lowest gear of the gearshift mechanism of the electric bicycle is engaged.

Figure 2:
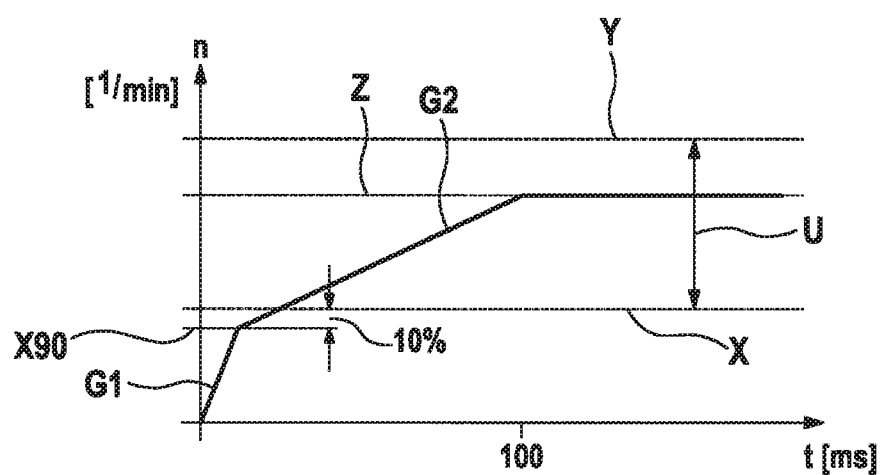
FIG. 2 shows a diagram which shows a rotational frequency n of the electric driver over time t during the run-up of the electric drive.

FIG. 2 shows rotational frequency n in 1/min over time t in ms.

Control unit 10 is set up so that a run-up to rotational target frequency Z takes place at a first gradient G1 and a second gradient G2. First gradient G1 is greater than second gradient G2. This is immediately obvious from FIG. 2, where curve G1 of the first gradient is steeper than curve G2 of the second gradient.

According to this exemplary embodiment, the run-up of electric drive 3 is carried out in such a way that first gradient G1 is run up to approximately 90% of the lowest rotational frequency X of the gearshift mechanism. Then, electric drive 3 is run up to rotational target frequency Z at the lower steepness of second gradient G2. This ensures that no jerky coupling of the electric motor occurs since electric motor 3 is rapidly run up to maximally 90% of minimum rotational frequency X at first gradient G1. This is followed by a slower run-up at second gradient G2, which has a clearly flatter rise characteristic. Rotational target frequency Z is reached after approximately 100 ms.

Control device 10 according to the present invention thus is configured for accelerating at a high gradient G1 to a rotational frequency just below minimum rotational speed X of the gearshift mechanism of the electric bicycle and for then accelerating to a desired rotational frequency at a smaller gradient G2. The minimum and maximum rotational frequencies in the lowest or highest gear of gearshift mechanism 6 have been stored in a memory of control unit 10 in advance. First gradient G1 and second, smaller gradient G2 can likewise be stored in the control unit on a permanent basis. As an alternative, however, control unit 10 can also ascertain an instantaneous driving speed and determine the gradients for first and second gradients G1, G2 on the basis of the instantaneous driving speed. As a further alternative or in addition, a drive torque contributed by a driver also may be utilized for determining gradients G1 and G2. This is useful, for example, when such a torque sensor is installed in the electric bicycle anyway for acquiring a torque supplied by the driver. The present invention therefore makes it possible to additionally use for the run-up of electric drive 3 also values of the electric bicycle that are acquired by existing sensors as it is.

According to the present invention, a switchover instant at which control unit 10 switches from the first to the second gradient is preferably also ascertained as a function of the minimum and/or maximum transmission ratio.

Since the actual gear selection is not known in the example according to the invention, a fuzzy range U results, which lies between minimum rotational frequency X and maximum rotational frequency Y of gearshift mechanism 6.

In the present invention, a smooth and jerk-free coupling of electric drive 3 into crank gear 2 thus is able to take place, which protects mechanical components of the electric bicycle, in particular transmission components and freewheels and the like. Especially preferably, control unit 10 does not use any additional sensor signals for ascertaining gradients G1 and G2 for the run-up of electric drive 3, but is able to utilize already existing sensor signals such as, in particular, a vehicle speed and/or a torque applied by the driver, and/or a rotational frequency at the crank gear. The actual engagement of electric drive 3 then takes place at a lower gradient G2 in a smooth manner and without any damaging effect on components.

What is claimed is:

1. A method for controlling an electric drive of a vehicle, the vehicle being configured to be selectably powered by at least one of human muscular energy and the electric drive, the vehicle including a crank gear, and the electric drive being situated at the crank gear, the method comprising:
    ascertaining, by a control unit of the vehicle, a target driving situation for which the electric drive is to be used for powering the vehicle;
    in the target driving situation, initially running up the electric drive at a first gradient, and subsequently running up the electric drive at a second gradient, wherein the first gradient is greater than the second gradient; and
    coupling the electric drive into the crank gear using the second rotational frequency gradient;
    wherein the control unit is configured for accelerating at the first gradient, which is a high gradient, to a rotational frequency just below minimum rotational speed of the gearshift mechanism of the vehicle and for then accelerating to a desired rotational frequency at the second gradient, which is a smaller gradient than the first gradient.

2. The method as recited in claim 1, wherein the vehicle includes a gearshift mechanism having (i) a minimum ratio which supplies a maximum rotational frequency, and (ii) a maximum ratio which supplies a minimum rotational frequency, the electric drive being run up at the first gradient to a percentage share that is less than 100% of the minimum rotational frequency.

3. The method as recited in claim 2, wherein the control unit ascertains at least one of the first gradient and the second gradient based on a transmission ratio of the gearshift mechanism.

4. The method as recited in claim 3, wherein one of:
    (i) the control unit ascertains at least one of the first gradient and the second gradient based on at least one of a maximum transmission ratio and a minimum transmission ratio of the gearshift mechanism; or
    (ii) the transmission ratio of the gearshift mechanism is a current transmission ratio detected by a sensor.

5. The method as recited in claim 3, wherein the at least one of the first gradient and the second gradient is ascertained based on at least one of (i) a vehicle speed, (ii) a torque, which is supplied by human muscular energy at the crank gear, and (iii) a rotational frequency which is supplied by human muscular energy at the crank gear.

6. The method as recited in claim 3, wherein at least one of (i) the run-up of the electric drive at the first gradient and (ii) the run-up of the electric drive at the second gradient is carried out only during a predefined period of time.

7. A vehicle configured to be selectably powered by at least one of human muscular energy and the electric drive, the vehicle comprising:
    a crank gear;
    an electric drive situated in the region of the crank gear; and
    a control unit configured to:
        ascertain a target driving situation for which the electric drive is to be used for powering the vehicle;
        in the target driving situation, initially run up the electric drive at a first gradient, and subsequently run up the electric drive at a second gradient, wherein the first gradient is greater than the second gradient; and
        coupling the electric drive into the crank gear using the second rotational frequency gradient;
    wherein the control unit is configured for accelerating at the first gradient, which is a high gradient, to a rotational frequency just below minimum rotational speed of the gearshift mechanism of the vehicle and for then accelerating to a desired rotational frequency at the second gradient, which is a smaller gradient than the first gradient.

8. The vehicle as recited in claim 7, further comprising:
    a gearshift mechanism; and
    a memory which stores at least one of (i) a maximum transmission ratio of the gearshift mechanism which supplies a minimum rotational frequency, and (ii) a minimum transmission ratio of the gearshift mechanism which supplies a maximum rotation frequency;
    wherein the control unit is configured to ascertain at least one of the first gradient and the second gradient based on at least one of the maximum transmission ratio and the minimum transmission ratio of the gearshift mechanism.

9. The vehicle as recited in claim 8, further comprising:
    a speed sensor, which detects a speed of the vehicle;
    wherein the control unit is configured to ascertain at least one of the first gradient and the second gradient based on the detected speed of the vehicle.

10. The vehicle as recited in claim 8, further comprising:
    a rotational frequency sensor, which detects at least one of (i) a rotational frequency applied at the crank gear by human muscular energy, and (ii) a torque applied at the crank gear by human muscular energy;
    wherein the control unit is configured to ascertain at least one of the first gradient and the second gradient based on at least one of the detected rotational frequency and the detected torque at the crank gear.

11. The vehicle as recited in claim 8, further comprising:
    a sensor for detecting an actual transmission ratio of a gearshift mechanism.

* * * * *